(12) United States Patent
Oldham et al.

(10) Patent No.: US 12,198,309 B2
(45) Date of Patent: Jan. 14, 2025

(54) PHASE DETECTION AND CORRECTION USING IMAGE-BASED PROCESSING

(71) Applicant: THE REGENTS OF THE UNIVERSITY OF MICHIGAN, Ann Arbor, MI (US)

(72) Inventors: Kenn Oldham, Ann Arbor, MI (US); Thomas D. Wang, Ann Arbor, MI (US); Mayur Bhushan Birla, Ann Arbor, MI (US); Xiyu Duan, San Jose, CA (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 537 days.

(21) Appl. No.: 17/288,886

(22) PCT Filed: Oct. 25, 2019

(86) PCT No.: PCT/US2019/058166
§ 371 (c)(1),
(2) Date: Apr. 26, 2021

(87) PCT Pub. No.: WO2020/087015
PCT Pub. Date: Apr. 30, 2020

(65) Prior Publication Data
US 2021/0383512 A1    Dec. 9, 2021

Related U.S. Application Data

(60) Provisional application No. 62/751,264, filed on Oct. 26, 2018.

(51) Int. Cl.
*G06T 5/73*        (2024.01)
*G06T 7/00*        (2017.01)

(52) U.S. Cl.
CPC .............. *G06T 5/73* (2024.01); *G06T 7/0012* (2013.01); *G06T 2207/10068* (2013.01); *G06T 2207/30004* (2013.01)

(58) Field of Classification Search
CPC .................. G06T 5/003; G06T 7/0012; G06T 2207/10068; G06T 2207/30004
(Continued)

(56) References Cited

U.S. PATENT DOCUMENTS

2012/0330157 A1   12/2012   Mandella et al.
2016/0004060 A1   1/2016    Simpson et al.
(Continued)

OTHER PUBLICATIONS

Notification of First Office Action for Chinese Application No. 201980074812.1, dated Jan. 28, 2023.
(Continued)

*Primary Examiner* — Michael R Neff
(74) *Attorney, Agent, or Firm* — MARSHALL, GERSTEIN & BORUN LLP

(57) ABSTRACT

A computer-implemented method includes receiving a raw data set representing an image of a sample, identifying a first set of extremum by analyzing the raw data set using a metric algorithm, identifying a second set of extremum by analyzing the first set of extremum, and generating, based on the second set of extremum, a reconstructed image of the sample. A phase correcting scanner includes one or more processors, one or more scanner adapted to sequentially sample an object to generate a vector of raw data representing the object in a Lissajous pattern, and memory storing instructions that, when executed by the one or more processors, cause the computing system to receive the vector of raw data, identify a first set of extremum by analyzing the raw data set using a metric algorithm, and identify a second set of extremum by analyzing the first set of extremum.

19 Claims, 15 Drawing Sheets

(58) Field of Classification Search
USPC .......................................................... 382/128
See application file for complete search history.

(56) References Cited

U.S. PATENT DOCUMENTS

2016/0266225 A1   9/2016  Johnson et al.
2019/0370967 A1*  12/2019  Matsubara ............ G06T 7/0002

OTHER PUBLICATIONS

International Search Report and Written Opinion, corresponding International Application No. PCT/US19/58166, mailing date Jan. 30, 2020.

* cited by examiner 102 104

106 108

112-A

112-B

112-C

112-D

210

212

214

216

218

302

PHASE DETECTION AND CORRECTION USING IMAGE-BASED PROCESSING

CROSS-REFERENCE TO RELATED APPLICATIONS

This application claims priority to International Patent Application No. PCT/US19/58166 filed on Oct. 25, 2019, in the United States Receiving Office, which claims the benefit of U.S. Provisional Application 62/751,264 filed on Oct. 26, 2018, the entire disclosure of which is incorporated herein by reference.

STATEMENT OF GOVERNMENTAL INTEREST

This invention was made with government support under CMMI-1334340 awarded by the National Science Foundation and under EB020644 awarded by the National Institutes of Health. The government has certain rights in the invention.

FIELD OF THE DISCLOSURE

The present disclosure generally relates to a system and method for tracking and/or correcting phase shifting during two-dimensional (2D) and/or three-dimensional (3D) scanning using an optical instrument. More particularly, methods and systems for detecting and/or correcting phase shifting during scanning (e.g., Lissajous scanning) with a two-axis micro-electro-mechanical system micro-mirror are presented.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Imaging using beam steering has many applications including biomedical imaging, scanning probe microscopy, 3D printing, single pixel cameras, scanning electron microscopy, light detection and ranging (LiDAR), etc. Various beam steering patterns, such as raster, spiral, and Lissajous, can be chosen depending on the imaging application and actuator capabilities. The scan pattern may have a direct effect on image resolution, field of view (FOV), and frame rate (FR). For instance, Lissajous scanning is obtained when both axes of motion are operated with a constant sinusoidal input, which may have differing frequency and/or phase. For many scanning actuators, a large FOV can be achieved by operating the scanner near its resonant frequencies. One can also achieve high FR by carefully engineering the resonant frequencies of scanner and displacement at these frequencies. Lissajous scanning is one of the popular choices in imaging applications as it can be easily implemented using one or more mirror galvanometer, miniaturized microelectro-mechanical system (MEMS) based scanners, etc. Unlike raster scanning, Lissajous does not require the two operating frequencies to be sufficiently far apart, simplifying MEMS design.

Lissajous scanning has many optical applications including biomedical imaging, scanning probe microscopes, single pixel cameras, etc. In a typical application, the points on an object plane are sequentially sampled using a scanner (e.g., an MEMS micro-mirror, mirror galvanometer, multi-photon optical probe, etc.). The intensity of light from different points on the object plane is recorded as a time series data referred to as the raw data. The sampling trajectory may be determined by a Lissajous pattern which in turn depends on scanning frequencies ($f_x$, $f_y$), displacement amplitude ($\theta_x$, $\theta_y$), and the phase delay ($\varphi_x$, $\varphi_y$) in the respective axis of the motion, (e.g., the x and y axes). An image of the object plane may be obtained upon placing the raw data in the image in the same sequence and position as it was scanned on the object plane. Thus, to reconstruct the image from the raw data accurate knowledge of scan trajectory may be necessary.

However, when using MEMS scanner, the actual scan trajectory may deviate from what is used in image reconstruction as the phase ($\varphi_x$, $\varphi_y$) drifts. MEMS scanners may operate at the resonant frequency of devices that have a natural oscillation. This oscillation may occur when the scanner is placed in an instrument (e.g., and endoscope) and again, when the endoscope is placed within an organism. The oscillation may be very small but may be enough to cause problems with image registration. Images may be blurry and may have a double-image effect, because the properties of the mirror are changed subtly once inside an endoscope and/or an organism.

The drift in phase can be attributed to numerous factors such as environmental conditions, changes in the scanner properties over time, etc. Even a small drift in phase can cause a large deviation in scan trajectory leading to poor image quality. If the drift is large enough the image is beyond recognition. Therefore, the effectiveness of a Lissajous scan and the accuracy of image reconstruction may be affected by phase difference between axes. In miniaturized devices, such as MEMS scanning mirrors, resonant frequency of a scanner (i.e., resonant micro-mirror) may drift by several degrees due to environmental perturbations. This drift in turn may produce a change in phase delay between mirror motion and the periodic, input driving signal.

Previous methods for compensating for phase shift in resonant devices include temperature-based calibration, onchip capacitive sensing, attempts to design for robust dynamics, and design to limit temperature sensitivity. However, these conventional methods suffer from poor repeatability, poor signal-to-noise ratios, and material limitations, especially when using small MEMS devices in severely space-constrained applications such as endoscopy. Various feedback controllers have been proposed, but these controllers are also susceptible to sensing limitation in small, in vivo instruments, and these controllers increase system complexity.

Moreover, some devices such as an endomicroscope may require miniaturized, MEMS-based scanners for compact packaging. As stated above, the phase $\varphi_i$ of such scanning may be prone to drift. The drifts in phase can be attributed to numerous factors such as variation in environmental conditions like temperature, changes in material property over time, etc. As such, the phase $\varphi_i(t)$ may be a slow function of time, creating difficulty in image reconstruction. The phase can be experimentally determined in a controlled environment (e.g., a laboratory) to reconstruct the image. However, in practical applications, the phase determined in lab starts will not remain constant indefinitely. It may be possible to adjust the phase manually to compensate the drift for sparse images, but manual adjustment requires substantial user experience and it becomes almost impossible to adjust the phase for complex images with unknown structure.

In general, sharpness-based auto-focus procedures are known techniques. However, the art does not include sharpness-based auto-focus procedures for tracking and/or correcting for drift in phase delay arising from dynamics of MEMS scanning mirrors and/or other compact scanners that might be used to produce a Lissajous pattern. Therefore, methods and systems of tracking and/or overcoming phase drift at regular time intervals during Lissajous scanning are needed.

BRIEF SUMMARY

This Brief Summary is provided to introduce a selection of concepts that are further described below in the Detailed Description in a simplified form. This Brief Summary is not intended to identify key features or essential features of the claimed subject matter, nor is it intended to be used to limit the scope of the claimed subject matter.

In one aspect a computer-implemented method of predicting and/or correcting phase drift includes receiving a raw data set representing an image of a sample, identifying a first set of extremum by analyzing the raw data set using a metric algorithm, identifying a second set of extremum by analyzing the first set of extremum, and generating, based on the second set of extremum, a reconstructed image of the sample.

A phase correcting scanner includes one or more processors, one or more scanner adapted to sequentially sample an object to generate a vector of raw data representing the object in a Lissajous pattern, and memory storing instructions that, when executed by the one or more processors, cause the computing system to receive the vector of raw data, identify a first set of extremum by analyzing the raw data set using a metric algorithm, and identify a second set of extremum by analyzing the first set of extremum.

DETAILED DESCRIPTION

Figure 1A:
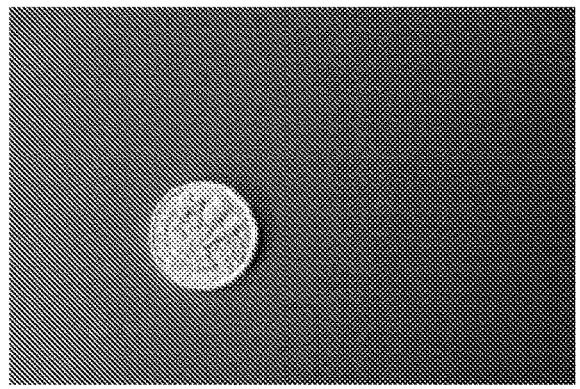
FIG. 1A depicts a series of example images demonstrating phase drift effects, according to an embodiment.
Figure 1A:
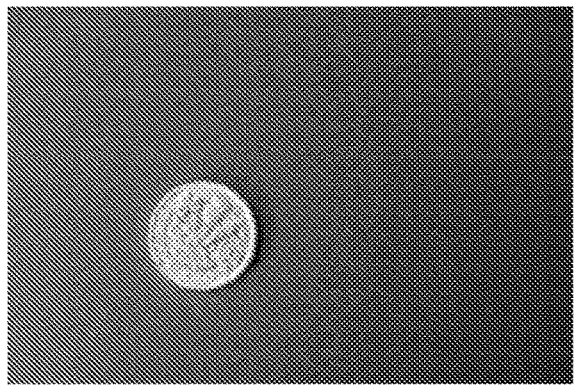
Figure 1A:
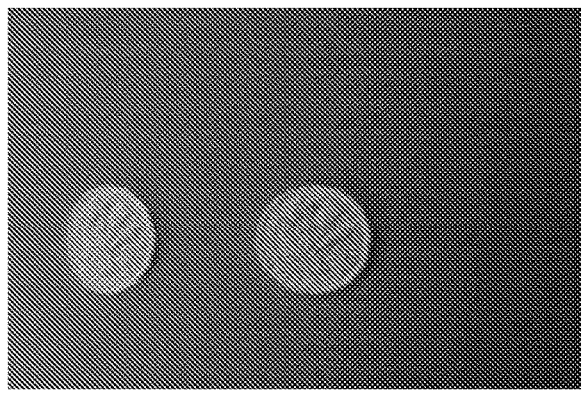
Figure 1A:
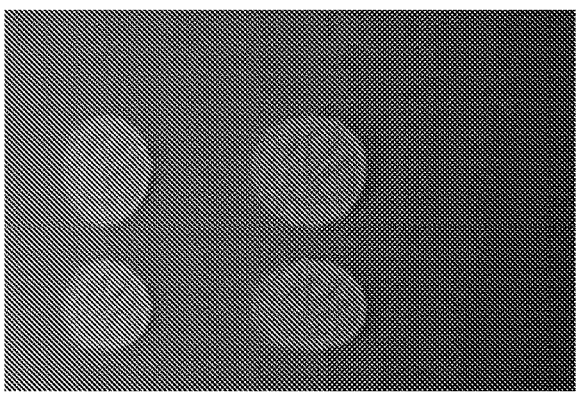

Although the following text sets forth a detailed description of numerous different embodiments, it should be understood that the legal scope of the description is defined by the words of the claims set forth at the end of this text. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The present techniques include a threshold-based blur metric which may binarize raw data of an image to predict the phase error in the reconstructed image. The present techniques include a sharpness-based method and system for tracking phase shifting during scanning (e.g., Lissajous scanning) with a two-axis MEMS micro-mirror. The MEMS mirrors may be electrostatic scanning mirrors with two axes of rotation to develop an image in one or more image plane. The axes may be scanned with high frequencies to generate a Lissajous scan.

The variance-based sharpness metric may be used to determine a true phase value successfully. The present techniques may include sharpness metrics for auto-focusing in several applications that may compensate for phase drift during scanning (e.g., Lissajous scanning). The present techniques correct for phase drift arising from dynamic parameter variation in micro-scanners using previously unknown methods and systems. The problems that arise during image reconstruction with a MEMS mirror may be addressed by an algorithm, according to an embodiment, for identifying the relative phase of the two axes. The effectiveness in a prototype endoscopic imaging probe, according to an embodiment, is also disclosed herein. In addition, the interaction between sharpness-based phase detection and other trade-offs in scanner design, such as fill factor (FF) versus frame rate and non-uniform scan density, are discussed, as well as practical approaches for managing such trade-offs for the MEMS scanner.

As noted above, the phase $\varphi_x$, $\varphi_y$ may drift when using a MEMS scanner, due to deviation of the scan trajectory. Scan trajectory may deviate due to various reasons, including without limitation environmental perturbation, changes in material properties of the scanner, etc. To overcome this problem, the present techniques disclose image processing techniques for accurately predicting the phase $\varphi_x$, $\varphi_y$. Specifically, methods and systems are disclosed for identifying the phase by recognizing that the image is sharpest or least blurred when reconstructed with accurate phase. The present techniques disclose various metric algorithms, which may include sharpness and/or blurriness metrics (e.g., variance, threshold-based, etc.) for accurately predicting the phase. In one embodiment, a phase along one axis (e.g., x) is swept by keeping the phase for y axis constant equal to an initial guess. For each phase value an image is constructed and its sharpness (or blurriness) is calculated. The phase $\varphi_x$ is predicted that corresponds to sharpest (or least blurry) image. A similar procedure may be followed to obtain the phase $\varphi_y$ wherein the phase along the x axis is set to the predicted value of $\varphi_x$.

Example Scanning Model and Phase Drift Effects in Reconstruction

The displacement of a scanner may be modeled as a function of time. If the scanner is driven along a particular axis with a driving voltage given by $$V_k(t) = A_k \sin(2\pi f_k t + \psi_k),$$

Within its linear limit of dynamic behavior, then the motion of scanner along the respective axis may be modeled as $$\theta_k(t) = D_k \sin(2\pi f_k t + \psi_k + \varphi_k(t))$$

where subscript k represents the parameters along respective axes (x or y), $f_k$ is the driving frequency close to resonance in the x and y axes, $\psi_k$ is the phase of a driving voltage, $\theta_k$ is the mechanical displacement of the scanner, and $\varphi_k(t)$ is the phase difference between scanner motion and input voltage at the current driving frequency.

In an embodiment, one or more scanners (e.g., two single axis scanners, a bi-axial scanner, etc.) may be used to sample points from an object plane. The points may be sampled (e.g., sequentially) while steering a laser beam using a single axis scanners and/or a bi-axial scanner. The sequentially-sampled data may include time series raw data. In some embodiments, configurations of other data structures may be used to store the intensities (e.g., a purpose-built time series data structure).

An image can be reconstructed from raw data if one knows the trajectory of the laser point on the object plane as a function of time. The laser motion may depend on parameters $f_k$, $\psi_k$, $\varphi_k(t)$, and $D_x/D_y$, where $f_k$, and $\psi_k$ are known, ratio $D_x/D_y$ can determined experimentally, but $\varphi_k(t)$ is frequently unknown or imperfectly known due to environmental perturbations. In particular, phase $\varphi_k$ is prone to drift in MEMS-based scanners, which are typically used in low power and/or miniaturized applications such as endomicroscopy. Phase drifts in one or both axes can be attributed to numerous factors such as variation in environmental conditions including temperature, changes in material property over time, etc. This makes the phase $\varphi_k(t)$ a slow function of time and creates difficulty in image reconstruction. The phase $\varphi_k(t)$ may be experimentally determined in a controlled environment (e.g., a lab) to reconstruct the image. However, in practical application, the phase determined in the lab will not remain constant indefinitely.

The phase $\varphi_k(t)$ may be written as $$\varphi_k(t) = \varphi_k^\circ + \Delta\varphi_k(t),$$

where $\varphi_k^\circ$ is a constant and $\Delta\varphi_k(t)$ is phase drift. It may be possible to adjust the phase manually to compensate the drift $\Delta\varphi_k(t)$ for sparse images. However, manual adjustment requires substantial user experience and time, and it becomes almost impossible to adjust the phase for images of structures that are new to the user (e.g., a tissue sample of an unfamiliar organism). Thus, there is a need to determine the correct phase at a regular interval of time, with minimal disruption to the endoscopy procedure.

FIG. 1A depicts a series of example images demonstrating phase drift effects. The deviation between the respective example images demonstrates, visually, the effect of inaccurate phase on image reconstruction using, for example, auto-focus or similar techniques. FIG. 1A includes an original image 102 depicting raw data. The raw data of original image 102 may be generated by simulating MEMS-based scanning in the Lissajous style. For example, example scanning frequencies and phases of $f_x$=19251 Hz, $f_y$=3315 Hz, and $\varphi_x$=2.8456, $\varphi_y$=0.3989 may be used to simulate the laser scan pattern. A large number of samples (e.g., $10^6$ samples) may be recorded, assuming a sampling rate of $10^7$ samples/sec. The location of the simulated laser point at any sampling instance may be rounded to the nearest pixel location.

FIG. 1A includes a reconstructed image 104 corresponding to the original image 102, using accurate values of $\varphi_x$ and $\varphi_y$. For example, the original image 102 may be a first three-dimensional image, and the reconstructed image 104 may be a second three-dimensional image, wherein either respective three-dimensional image includes two or three channels (e.g., grayscale or red, green, and blue) and each channel includes a two-dimensional array of pixels. In some cases, the three-dimensional image may be represented by raw data (e.g., a multi-dimensional array of channels each channel including a multi-dimensional array of pixels). The original image 102 and/or the reconstructed image 104 may be a grayscale (i.e., two-dimensional image). Effects of phase drift may be seen by the introduction of error along one or more axis. For example, a reconstructed image 104 may be reconstructed from the raw data using accurate values of $\varphi_x$ and $\varphi_y$. If an error/drift of $\Delta\varphi_x=\pi/8$ rad is introduced, then a reconstructed image 106 may be generated. The reconstructed image 106 may include an overlap of the reconstructed image 104 with itself with an offset corresponding to $\Delta\varphi_x$. This offset can be attributed to the fact that the image registration during a right scan does not overlap precisely with a left scan. Moreover, the offset between the right and the left scan images is not a linear function of $\Delta\varphi$ as it is mapped via a sinusoidal function. If there is an error of $\pi/8$ rad for both phases ($\Delta\varphi_x$ and $\Delta\varphi_y$), then the output image may have (for example) four overlapping images, as depicted in a reconstructed image 108—once each for the right, left, up, and down scanning directions. FIG. 1A provides a simple view of the drift problem, but even a small error in phase leads to a blurry image, significantly affecting image resolution, and hence the desirability, interpretability, and reliability of the resulting output image. This potential for undesirability puts a stringent requirement on the accuracy with which the phases should be predicted and/or detected. It should be appreciated by those of skill in the art that in some embodiments, the accuracy may be parameterized, to modulate analysis latencies and/or increased accuracy.

Scan Design and Image Reconstruction

Figure 1B:
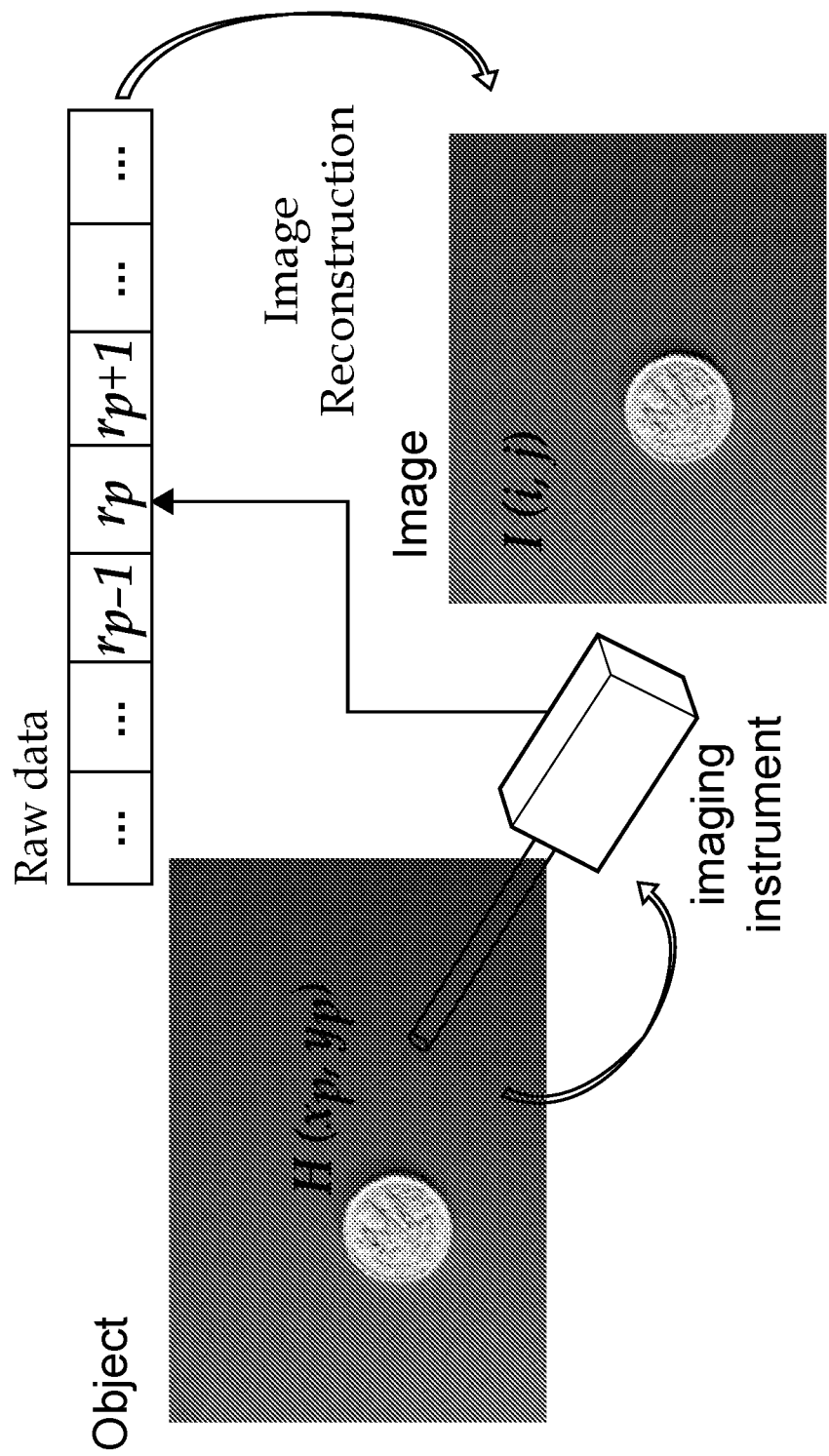
FIG. 1B depicts a data flow diagram for image reconstruction, according to an embodiment.

FIG. 1B depicts a data flow diagram 110 illustrating image construction in an imaging instrument via scanning (e.g., Lissajous scanning). The data flow diagram 110 may include an object H, an imaging instrument (e.g., a single-pixel camera), a raw data vector, and an image I. The object H may be any suitable object (e.g., a tissue of an organism). To generate a grayscale imaging via single point scanning, the points $(x_p, y_p)$ on the object H may be sequentially sampled at constant frequency $f_s$, and intensity of light, $H(x_p, y_p)$, from point p is stored as data sample $r_p$ in the raw data vector. By this process, the two-dimensional image of the object $H(x_p, y_p)$ is translated into a one-dimensional time series data $r_p$. Thus, the vector R of points $r_p$ has the intensities from the object H recorded at a regular interval of time $\Delta t$ (the sampling time). The sequence of sampled points $(x_p, y_p)$ on the object plane is determined by the scanning pattern, in an embodiment, a Lissajous pattern. It should be noted that in Lissajous scanning a point from the object can be scanned multiple times, to increase the FF, leading to non-uniform scan density. The raw data is depicted as a vector, but the raw data may be stored in any suitable data structure (e.g., a set, an array, etc.). Further, it should be appreciated by those of skill in the art that any suitable imaging instrument and/or scanning pattern may be used.

The problem of image reconstruction may be posed, in some embodiments, as an inverse problem wherein $r_p$ is mapped to a two-dimensional image space (e.g., a discrete space) I(i, j), where the image I is a grey image (M×N matrix) of the object H. Thus, each ordered pair (i, j) may be expressed as a function of p. In embodiments including a discrete image space, the mapping of $r_p$ to I(i, j) may be a many-to-one because of non-uniform scan density and rounding of location of sample instance to the nearest pixel location. The final intensity of a pixel located at (i, j) may be the average of all such values of $r_p$ that are mapped to the same pixel (i, j). This process may be summarized by the calculations:

$$x_p = \tilde{D}_x \sin(2\pi f_x \ p \ \Delta t + \psi_x + \varphi_x(p \ \Delta t))$$
$$y_p = \tilde{D}_y \sin(2\pi f_y \ p \ \Delta t + \psi_y + \varphi_y(p \ \Delta t))$$
$$r_p = H(x_p, y_p)$$
$$i = \left[\frac{y_p M}{\tilde{D}_y}\right]$$
$$j = \left[\frac{x_p N}{\tilde{D}_x}\right]$$

where $\tilde{D}_x$ and $\tilde{D}_y$ are constants, $p \in \mathbb{N}$, and [ ] denotes a greatest integer function.

Phase Detection Using Threshold-Based Blur Metric Techniques and/or Variance-Based Sharpness Metric Techniques The present techniques include the use of autofocusing methods and systems based on image sharpness to detect the phase of two-axis MEMS scanner motion. In general, the sharpness of an image increases as the error in phase decreases. In other words, the image is sharpest when reconstructed with correct phase. In some embodiments, the relationship between image sharpness and phase may be framed as an optimization problem where the sharpness of an image, S, is maximized (or blur, B, is minimized) with respect to phase. In general, we may write:

$$\varphi^* = \arg\min_{(\varphi_x, \varphi_y)} g(\varphi_x, \varphi_y),$$

where, the objective function $g(\varphi_x, \varphi_y)$ can be $-S(\varphi_x, \varphi_y)$ or $B(\varphi_x, \varphi_y)$ or any combination of metrics that makes the image sharper and/or less blurred.

The original phase delay may be adjusted continuously, or tuned, using the extrema (i.e., minimum and maximum) calculations until the hypothetical phase delay optimizes a quantity. In one embodiment, a threshold-based blur metric for phase prediction/correction may be used. In another embodiment, a variance-based sharpness metric may be used. In some embodiments, metrics can be used to reduce the error $\Delta \varphi$ by making a local search in the vicinity of initial phase $\varphi^o$ which can be experimentally determined in a controlled lab environment. In an embodiment, the phase $\varphi_k(t) = \varphi_k^o + \Delta\varphi_k(t)$ can be predicted by making a global search in the domain [0,π] and then fine-tuning the phase value by local search.

It will be appreciated by those of skill in the art, that the threshold metric may be less robust/accurate compared to the variance metric in global search. However, it will also be appreciated that the threshold metric may be faster due to binary arithmetic that is better suited to real-time phase correction. This efficiency, and attendant sacrifice of negligible accuracy, may be of value when analyzing raw data comprising a high frame rate. Nonetheless, both metrics are demonstrably effective in predicting the phase error in practical implementation with a MEMS-based endomicroscope.

In an embodiment, the degree of blurriness in the image is not directly indicated, but rather, a "shorthand" method is used to signify the amount of repetition in an image with low computational complexity. In this embodiment, a predetermined threshold (σ, constant for the given optimization problem) is used to set the time series raw data R(t) to either zero or one. This binarized data is used to reconstruct the black and white (B/W) image, wherein "binarizing" indicates setting the intensity values to either 0 or 1 based on a threshold value. The blur metric may be defined as the total number of like pixels in the B/W image (i.e., the sum of all ones/zeroes). A normalized blur metric may be defined as $$B = \frac{\text{number of like pixels}}{\text{total number of total pixels}}.$$

One rationale behind the above definition of blur is that when an inaccurate phase is used to generate the image, the information is spread across the image. Thus, the like pixels may be spread across the image and may, therefore, increase the value of this blur metric. In general, the combination of phase delay in two axes may be selected which includes the "best" image, based on the blur metric and/or the sharpness metric.

Figure 1C:
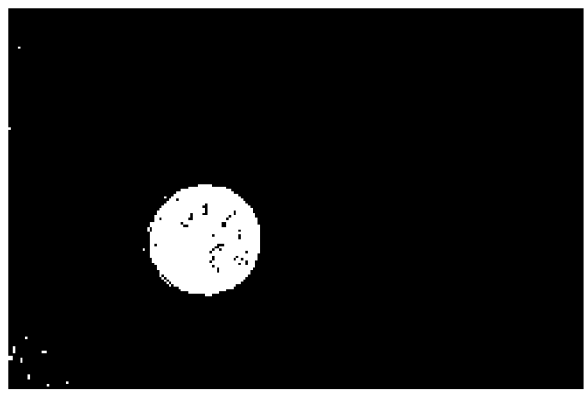
FIG. 1C depicts a set of binarized images demonstrating an intuition behind threshold metrics for phase drift effects.
Figure 1C:
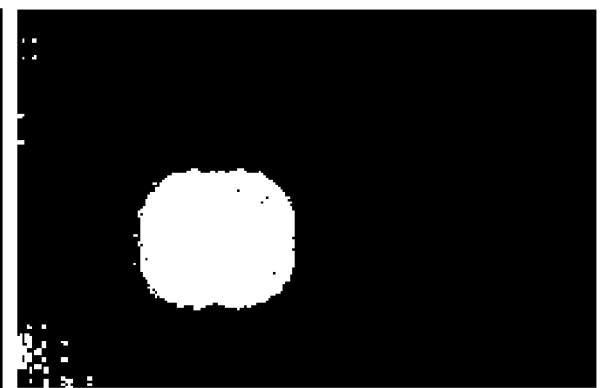
Figure 1C:
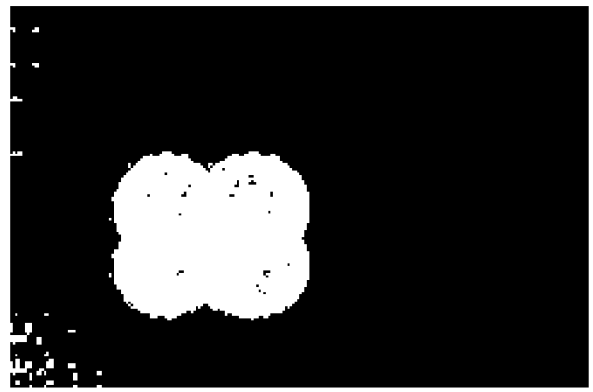
Figure 1C:
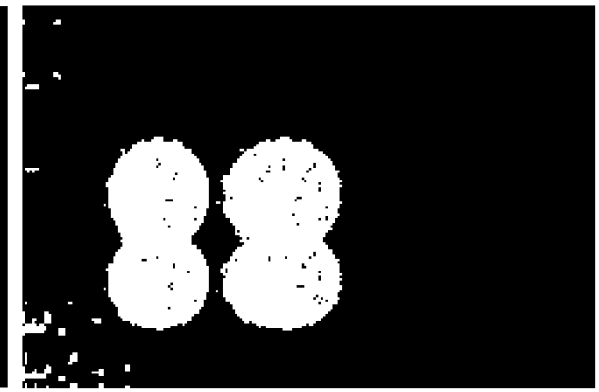

FIG. 1C depicts the relationship between the blur metric and overlapping in a set of binarized images 112A-112D. Specifically, FIG. 1C demonstrates the intuition behind threshold metric, of the set of binarized images 112-A through 112-D. Namely, that the threshold metric (i.e., number of like pixels) increases with an increase in phase error from 0 to 0.0757. The following table depicts exemplary values relating to the set of binarized images 112A-112D:

TABLE I

BLUR METRIC

| FIG. | PHASE ERROR $\Delta\varphi_x = \Delta\varphi_y$ (RAD) | B |
|---|---|---|
| 112-A | 0 | 0.0434 |
| 112-B | 0.025Π | 0.0901 |
| 112-C | 0.05Π | 0.1344 |
| 112-D | 0.075Π | 0.1640 |

In an embodiment, the set of binarized images 112-A through 112-D of FIG. 1C may correspond—respectively—to binarized versions of the original image 102, the reconstructed image 104, the reconstructed image 106, and the reconstructed image 108. The blur metric may be minimized when all four of the images exactly overlap with each other; i.e., when the output image is constructed with the true phase value. As the overlap grows, blur is reduced.

Figure 1D:
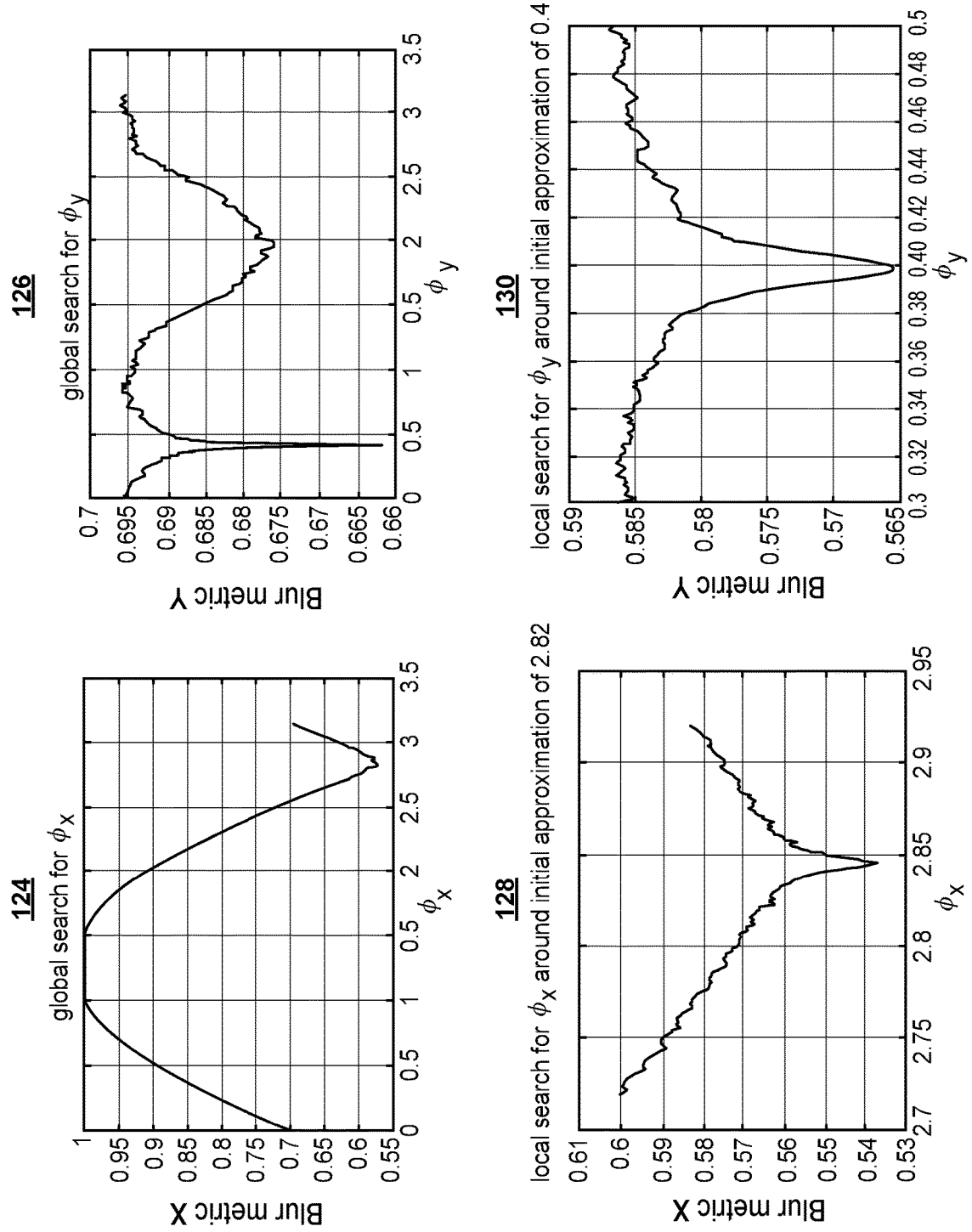
FIG. 1D depicts plots of threshold metrics vs. phase x and phase y according to a global search and a local search around initial approximation given by the global search, according to one embodiment and scenario.

FIG. 1D depicts the graphical results of a global search which may be conducted by the above-described phase prediction algorithm, wherein the global search sweeps $\omega_x$ and $\varphi_y$ from $[0,\pi]$ independently in increments of 0.02 rad. Specifically, graph 124 and graph 126 depict the results of the global search for $\omega_x$ and $\varphi_y$, respectively. Graph 128 and 130 depict the results of fine-tuning by a local search in the vicinity of extrema (i.e., minima and/or maxima) obtained from the global search. For example, the phase values predicted by the algorithm may be $\varphi_x^*=2.846$ and $\varphi_y^*=0.398$ rad as compare to true phase $\omega_x=2.8456$, $\varphi_y=0.3989$ rad. Conceptually, these results may be sensitive to the value of threshold (a) chosen to binarize the raw data. Although the global search is not proven to be robust and not guaranteed to provide the correct optimum value for all possible selections of the threshold, experimentation has shown that the blur metric is always locally minimized at $\varphi_x^*$, irrespective of the choice of the threshold value.

As noted, a primary benefit of the threshold-based blur technique is low computation time for real-time image reconstruction when the approximate phase is known. The algorithm works most effectively when the threshold (σ) is selected close to the mean of the raw data $\sigma=\bar{r}_p$ because such a mean selection approximately balances the count of zeroes and ones. Selecting a smaller value for the threshold $\sigma<<\bar{r}_p$ may increase the count of ones, and thus, in the reconstructed image, at any phase setting, there will be some overlap of ones (i.e., like pixels). Also, the sensitivity of the blur metric to change in the candidate phase is reduced. If ones are too sparse, i.e., $\sigma>>\bar{r}_p$, then the blur metric is almost constant with respect to phase and has a very steep slope near the true phase value. As a result, true phase may be missed by discrete steps taken while sweeping candidate phase values.

Example Variance-Based Sharpness Metric Embodiment

In an embodiment, a variance-based sharpness metric, among a variety of available metrics, may be used to detect and/or predict the phase. In a sharp image, a set of pixel intensity values may be well-separated, and thereby may increase the variance of pixel intensities. The variance of pixel intensities can be measured by a sharpness metric $$S = \frac{1}{MN}\sum_i^M \sum_j^N (I(i,j) - I_{avg})^2$$

-continued $$I_{avg} = \frac{1}{MN}\sum_i^M \sum_j^N I(i,j).$$

Figure 1E:
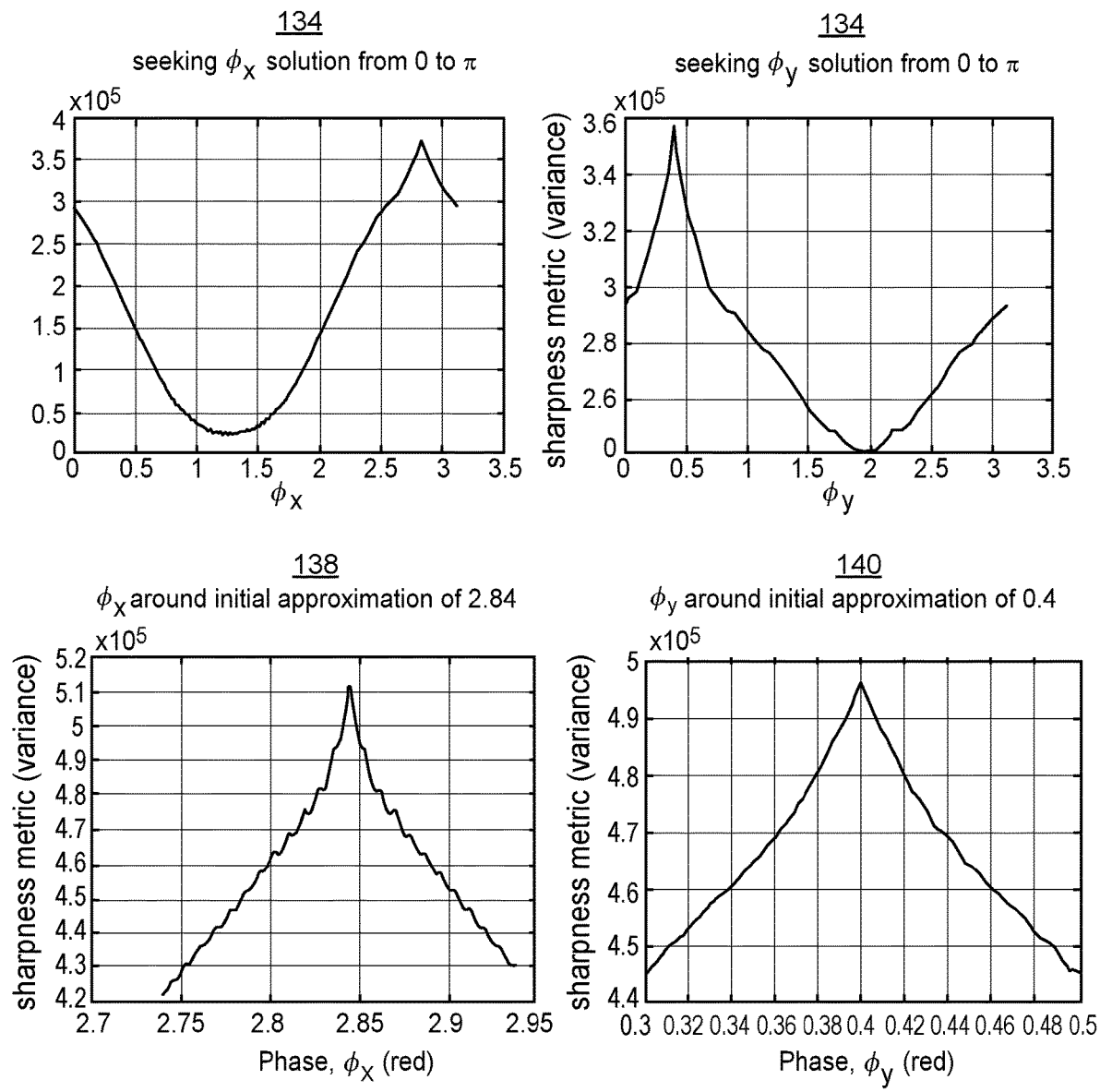
FIG. 1E depicts plots of sharpness (variance) metrics vs. phase x and phase y according to a global search and a local search around initial approximation given by the global search, according to one embodiment and scenario.

As in the above-discussed techniques relating to the threshold-based blur metric, in some embodiments, a global search for a variance metric may be made by sweeping the phase variables $\omega_x$ and $\varphi_y$ from $[0, \pi]$ independently as depicted in plot 134 and plot 136 of FIG. 1E. FIG. 1E depicts a local search around initial approximation given by the global search. FIG. 1E depicts, for each value of phase, constructing an image, and evaluating the sharpness metric in plot 138 and 140. The sharpness metric of plot 138 and plot 140 may be plotted as a function of phase, which depicts sharpness. As seen from the results of FIG. 1E, the image may be sharpest when closest to true phase value. As noted, the solution may be fine-tuned by doing a local search with smaller discrete steps. The phase values predicted by the algorithm are, respectively, $\varphi_x^*=2.846$ and $\varphi_y^*=0.398$. A comparison of the phase predicted by the above-described embodiment and the true phase is given in the following table:

RESULT COMPARISON

| | Phase X, $\varphi_x$ (rad) | Phase Y, $\varphi_y$ (rad) |
|---|---|---|
| True value | 2.8456 | 0.3989 |
| Predicted by blur metric | 2.846 | 0.398 |
| Predicted by sharpness metric | 2.846 | 0.398 |

Figure 1F:
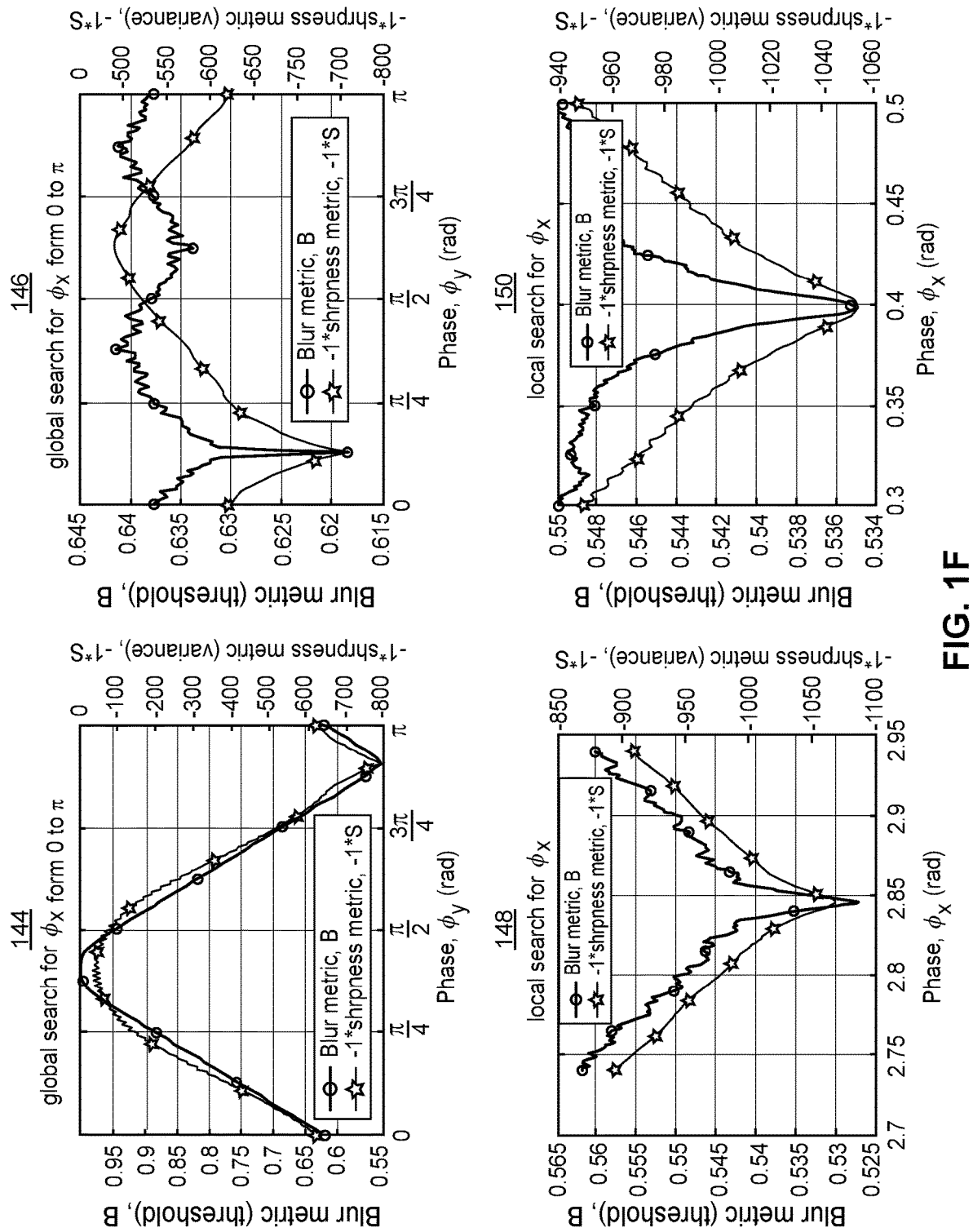
FIG. 1F depicts combined plots of threshold and sharpness metrics, according to some embodiments.

FIG. 1F depicts combined plots of threshold and negative variance metric vs. phase x and y. Specifically plots 144 and 146 depict, respectively a global search from 0 to π for phases x and y. Plots 148 and 150 depict, respectively, a local search around initial approximation given by global search. The plots in FIG. 1F may correspond to combined plots of FIGS. 1D and 1E. For example, Plot 144 may be the result of combining the blur metric plot 124 with the sharpness metric plot 134, wherein the sharpness metric plot 134 is negated to flip the vertical axis.

Example Tissue Imaging Embodiment

The present techniques may be applied to any suitable sample. In some embodiments, the above-described methods may be applied to a scanning mirror (e.g., a two-axis MEMS) installed in an endomicroscope (e.g., a single-axis confocal endomicroscope) during tissue imaging. Prior to installation, the phase delays of the scanning mirror may be a first manual estimate of $\varphi_x=18.1°$ for the x-axis and $\varphi_y=10.4°$ for the y-axis. After installation in the endomicroscope and while imaging the sample tissue, a phase compensation algorithm may, as discussed above, identify a second measurement as $\omega_x=19.423°$ and $\omega_y=12.491°$.

Figure 2A:
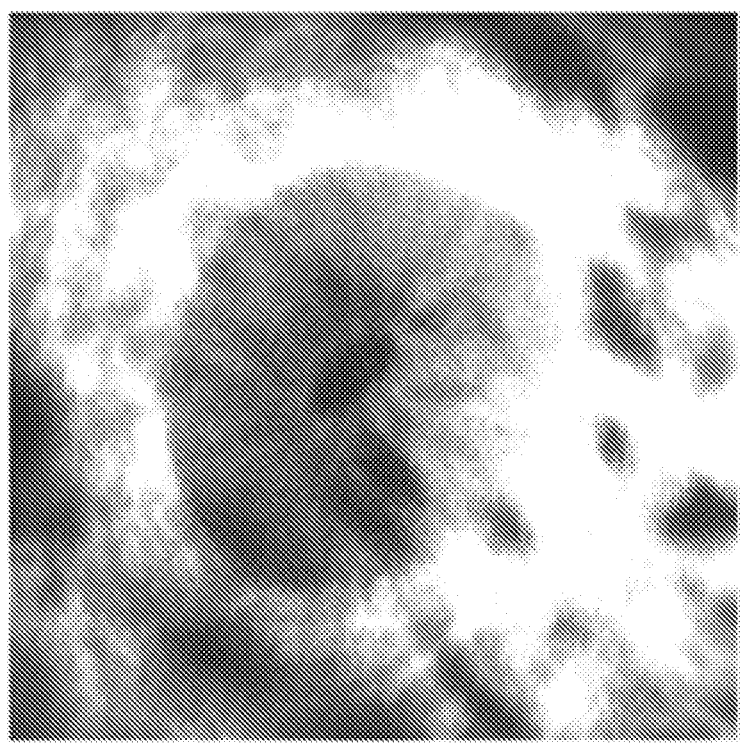
FIG. 2A depicts an improvement in image quality representative of a human colon tissue sample.
Figure 2A:
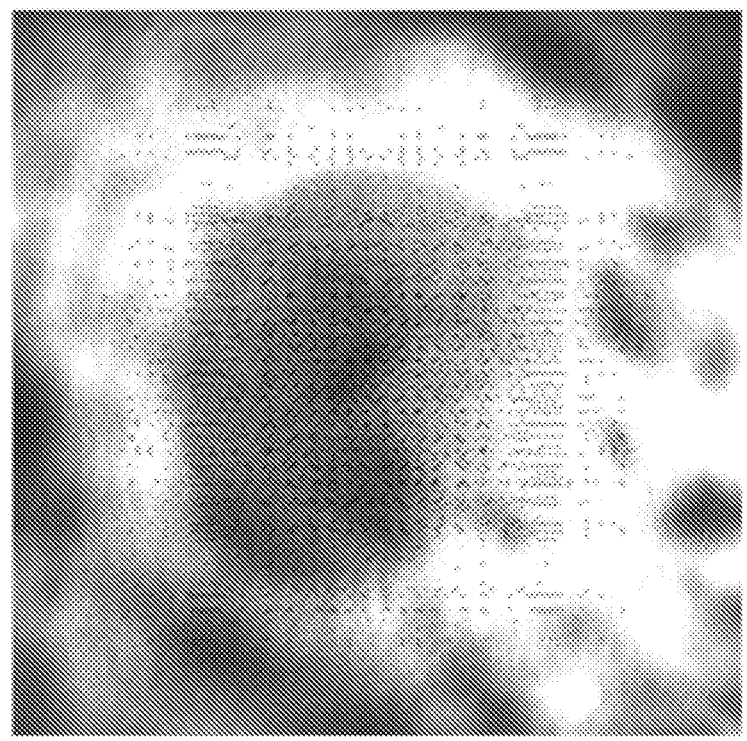

FIG. 2A depicts an improvement in image quality representative of a human tissue scan (e.g., of a tissue sample of the human colon) acquired before phase correction 202 (before image 202) and an image of the same tissue acquired after phase correction 204 (i.e., after image 204). For example, the respective images depicted in FIG. 2A may be generated by a two-axis scanning micro-mirror in a single-axis confocal imaging instrument, wherein the instrument corresponds to the imaging instrument depicted in FIG. 1B. In some embodiments, the tissue sample depicted in FIG. 2A may correspond to the object H depicted in FIG. 1B, and the image 202 and/or the image 204 may correspond to the image I in FIG. 1B.

Example Photographic Embodiment

Figure 2B:
FIG. 2B depicts test images used for verifying performance of blur, and sharpness metrics, according to some embodiments.
Figure 2B:
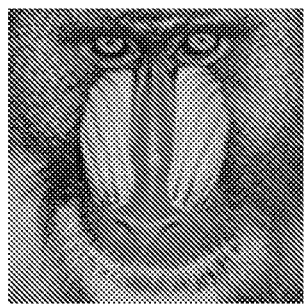
Figure 2B:
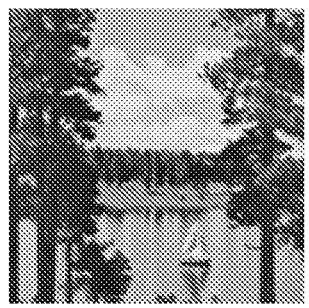
Figure 2B:
Figure 2B:
Figure 2C:
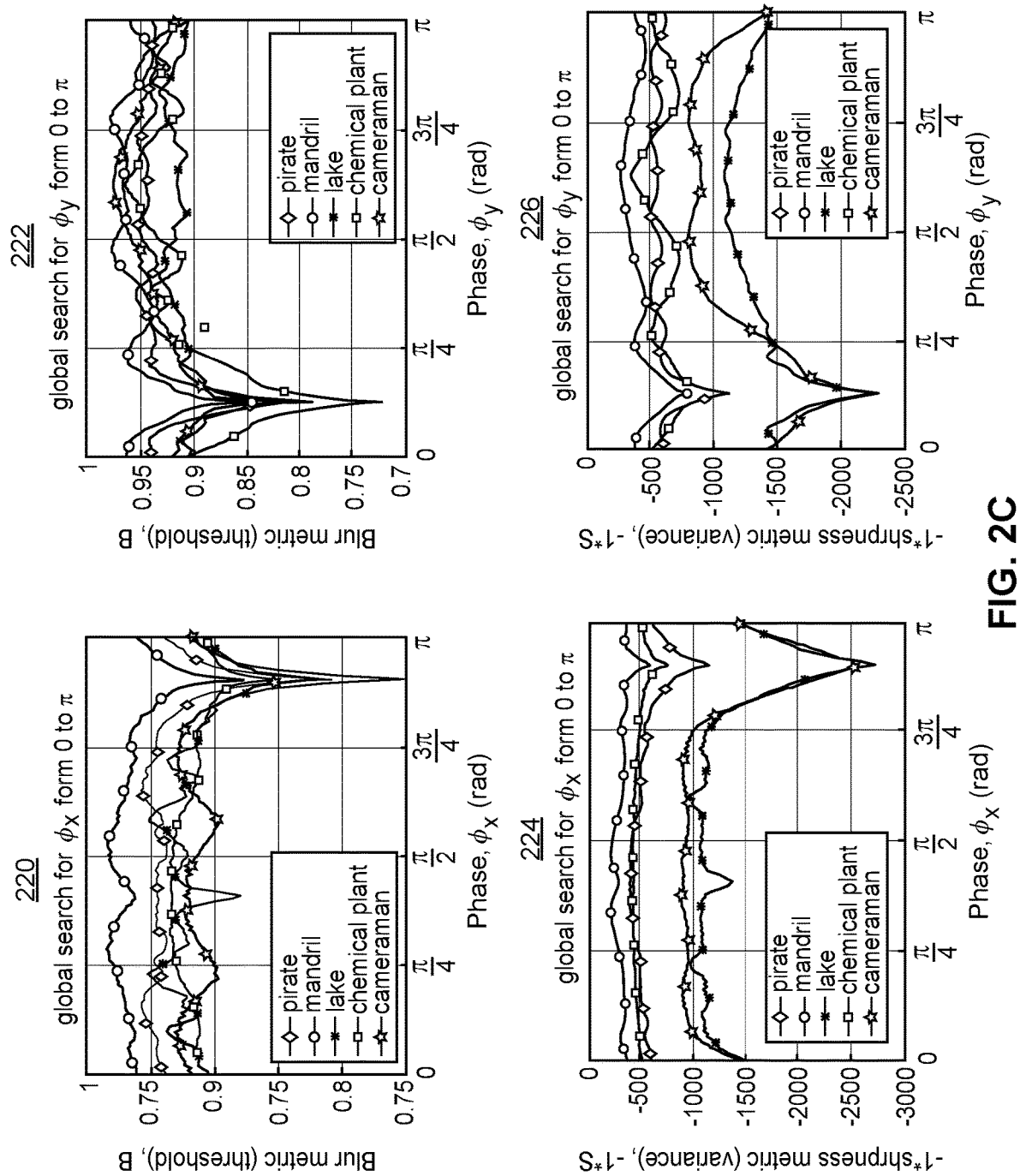
FIG. 2C depicts plots of global search for the test images of FIG. 2B.

The present techniques may be used in conjunction with images, such as the test images 210-218 depicted in FIG. 2B. FIG. 2B may include a pirate 210, a mandril 212, a lake 214, a chemical plant 216, and a cameraman 218. The test images 210-218 may be used to demonstrate the effectiveness of the phase detection algorithm and metrics. The test images 210-218 may be compressed to 256×256 pixels. Raw data may be simulated for each of the test images 210-218 using a scanner as described above using scanning frequencies and phases of $f_x$=19251 Hz, $f_y$=3315 Hz, and $\omega_x$=2.8456, $\varphi_y$=0.3989 rad to simulate a laser scan pattern for each of the test images 210-218. Global and local search algorithms may be applied to the raw data as described above to predict the phase value. FIG. 2C depicts the output of applying the blur and sharpness metrics to predict the phase value. Plot 220 and plot 222 depict a global search from 0 to π for blur metric x and y axis sweeps, respectively, for each of test images 210-218. Plot 224 and plot 226 depict a global search from 0 to π for negative sharpness metric x and y axis sweeps, respectively, for each of test images 210-218. In an embodiment, scanning the images 210-218 resulted in error less than $10^{-3}$ radians.

Example Image Reconstruction

As noted above, the Lissajous scan trajectory may depend on driving frequencies and the relative phase difference between them. For example, a repeating or non-repeating pattern may be obtained depending on whether the ratio of driving frequencies is a rational or an irrational number, respectively. A non-repeating curve may be desired as different pixels are scanned in each cycle (e.g., one cycle of the lower frequency), thereby covering more area on the object plane and improving the FF. FF may be defined as a ratio of number of pixels scanned at least once to the total possible number of pixels in the field of view. In a high-definition (HD) image, FF can be made sufficiently high by scanning for a long time, which may result in a lower frame rate. In general, effect leads to a trade-off between FR and FF, insofar as it is difficult to maximize both FR and FF for an HD image. In a high FR application using Lissajous scan, the reconstructed image may have missing pixels. As a mitigating factor, various algorithms may be used to complete these missing pixels in a post-processing step (e.g., after initial image reconstruction). However, it may be difficult to eliminate missing pixels during the phase prediction in an embodiment wherein the phase prediction step precedes other steps.

A large number of samples (e.g., a total of $10^6$) may be taken to simulate raw data from an image (e.g., the original image 102 in FIG. 1A). The number $10^6$ may be much larger (e.g., a factor of twenty or more times) than the number of pixels in the original image. If the image is reconstructed with a complete data set, there may be no missing pixels. However, in some embodiments, a subset of the raw data (e.g., ¼ of the raw data) may be used to study the effect of missing pixels on blur metric to predict the phase. In high FR imaging application, missing pixels may be unavoidable, and adversely affect both the metrics and may lead to error in results. For example, to continue the example, only the first $0.25 \times 10^6$ samples of the raw data may be used.

Figure 3A:
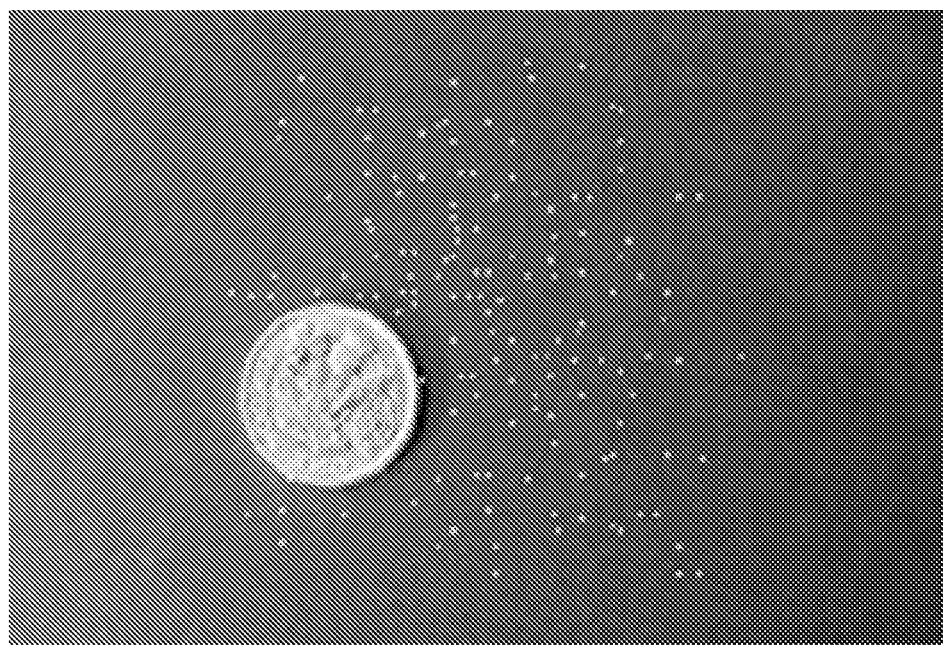
FIG. 3A depicts a reconstructed image 302 including missing pixels of the true phase.
Figure 3B:
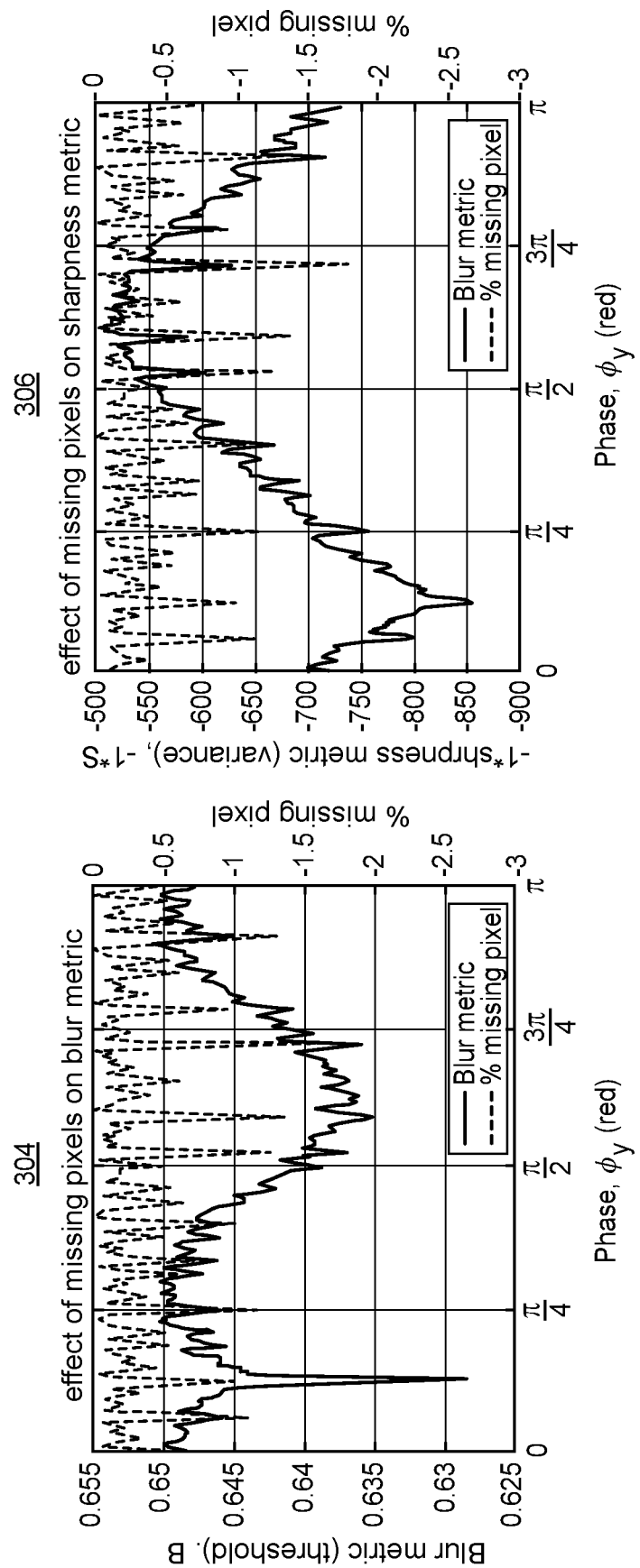
FIG. 3B depicts a plot of the effect of the missing pixels on the blur metric and a plot of the effect of the missing pixels on the sharpness metric.

Turning to FIG. 3A, a reconstructed image 302 is depicted, wherein the missing pixels are shown by dotted regions. The image 302 may have a high FR. In some embodiments, the missing pixels may be flagged by a separate color in the image reconstructed with true phase information. FIG. 3B depicts respective plots of the threshold and variance metrics, with respect to phase y, wherein the effect of the missing pixels is also shown. Specifically, plot 304 depicts the effect of missing pixels of the blur metric, and plot 306 depicts the effect of missing pixels on the sharpness metric. As compared to FIG. 1D and plot 146 of FIG. 1F, the blur metric has more high frequency variation with respect to $\varphi_y$. The percentage of missing pixels as a function of $\varphi_y$ is plotted on the right y axis of the plot 304 and the plot 306. The high frequency noise peaks in the blur metric of the plot 304 are aligned with the missing pixels. The sharpness-based phase prediction method may also suffer if the image has missing pixels. In an extreme case, the phase prediction method may fail if the contribution of missing pixels to the sharpness metric exceeds the depth of the global minimum at true phase.

Examples of Overcoming Problems in Traditional Lissajous Scanning

Figure 4:
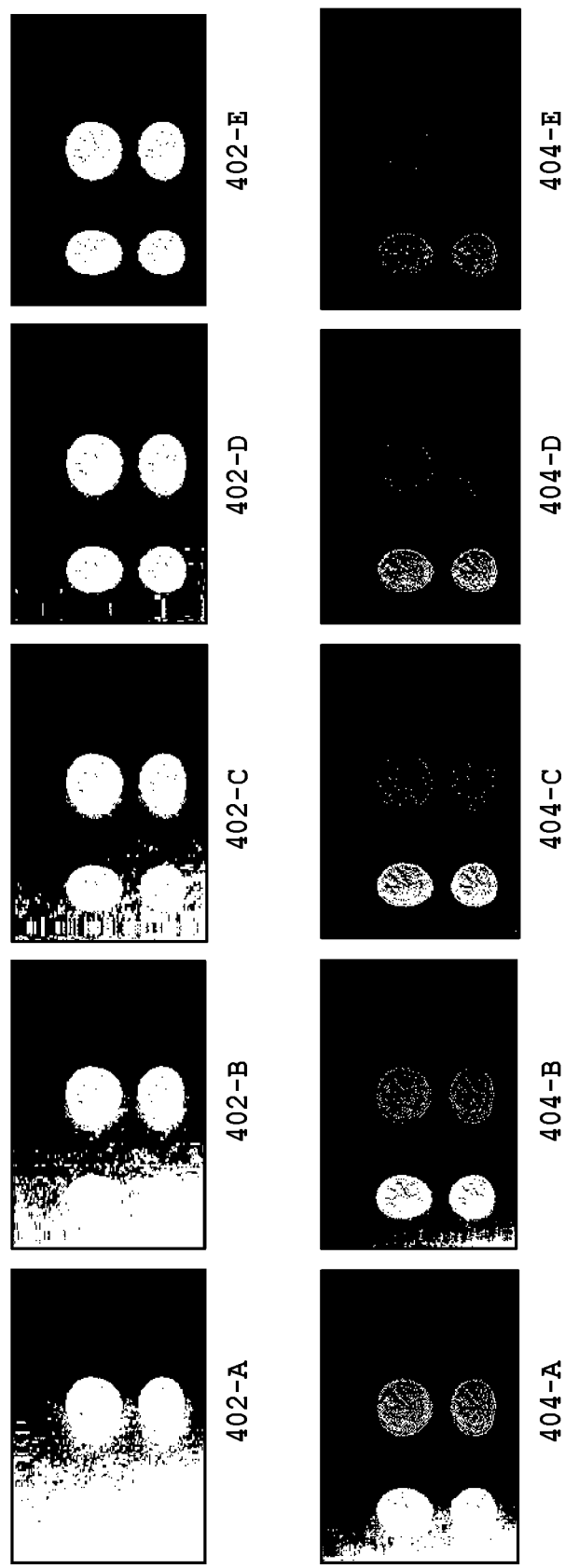
FIG. 4 depicts exemplary sequences of images showing binarizing raw data directly and binarizing a grayscale image.

In an example, the provided are techniques for timing of image binarization. FIG. 4 depicts effects of binarization of raw data. For example, FIG. 4 includes images 402-A through 402-E which depict, respectively, the effect of binarizing the raw data using the threshold value of $\sigma = c\overline{r_p}$ where constant c=1.3, 1.4, ..., 1.7. Of course, any suitable values of c may be chosen. In a threshold-based blur metric embodiment, the raw data itself may be binarized to construct a B/W image directly as shown in images 402-A through 402-E. The raw data may correspond to the raw data of FIG. 1A and/or FIG. 1C. In an embodiment, a grayscale image may be generated from raw data and then be binarized to a B/W image, as depicted in images 404-A through 404-E. In some embodiments, wherein binarization is performed directly on the raw data, a more legible image may be produced, as depicted in FIG. 4, wherein the images 402-A through 402-E of the coin are legible wherein the images 404-A through 404-E are not as legible. Therefore, binarizing the raw data before the image is formed may provide better detection of phase with increased sensitivity. However, in other embodiments, binarizing a grayscale image may be preferable.

Figure 5:
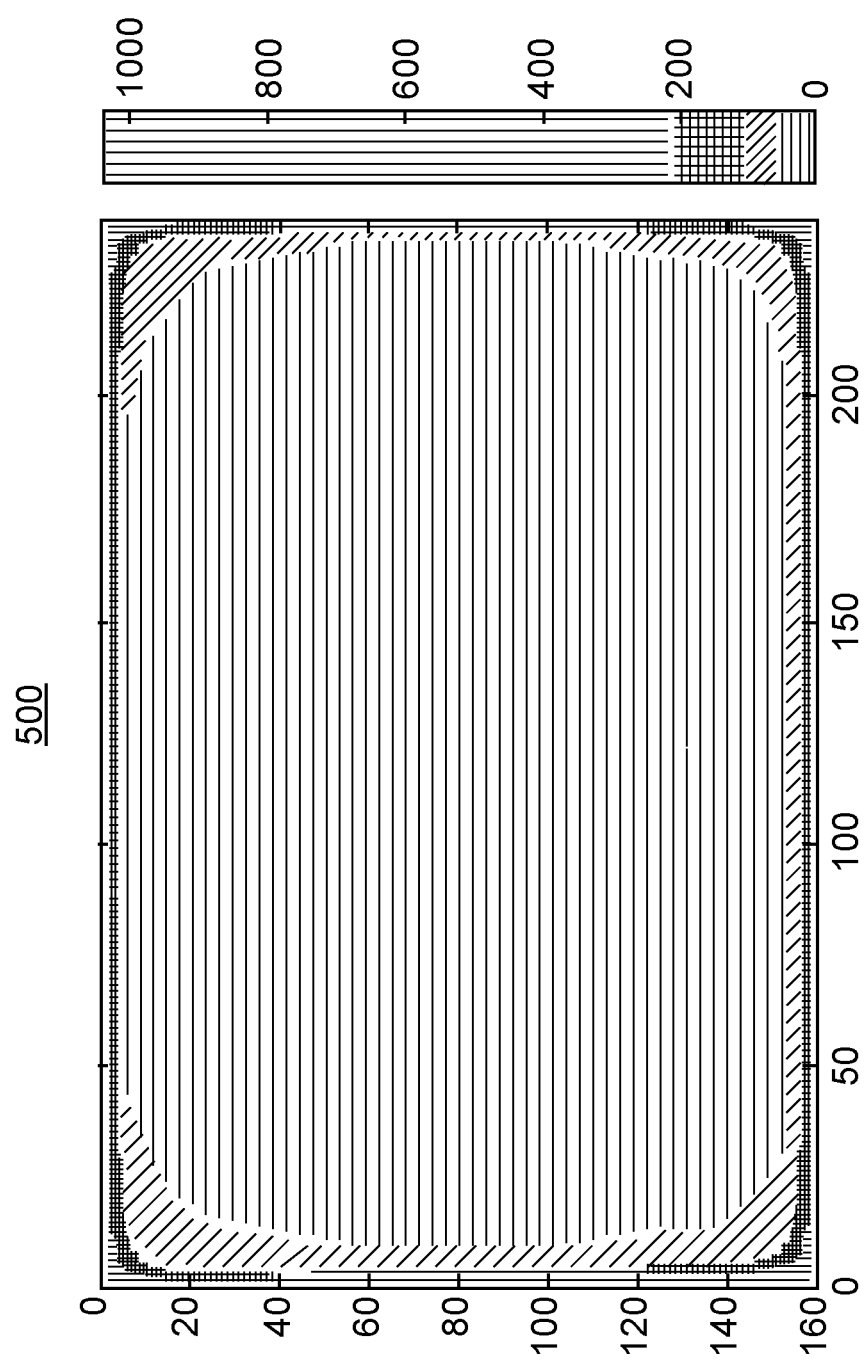
FIG. 5 depicts an exemplary plot of the density of an image generated by a scanner.

Another solution provided by the present techniques relates to addressing non-uniform scan density. Lissajous scanning may result in non-uniform scan density, wherein the number of data points sampled per unit area over the field of view differs between regions of the scanner. For example, as depicted in FIG. 5, the density of an image may be lowest at the center of a scan, and highest at the edges of the scan. In the depicted example of FIG. 5, an image of 240×160 pixels depicting non-uniform scan density is shown, generated with $f_x$=19251 Hz, $f_y$=3315 Hz. In FIG. 5, the center of the scanner and the edge of the scanner have, respectively, non-uniform densities because the speed of the scanner may be faster at the center and lower at the edges. Scanning the object multiple times may worsen the non-uniformity. Scan density is an aspect of the present techniques that may be corrected for to avoid an oversaturated image. FIG. 5 is intentionally simplified for explanatory purposes. In some embodiments, the scanning density may be represented using a color scale (e.g., a color gradient) or in another suitable way.

Example Environment

Figure 6:
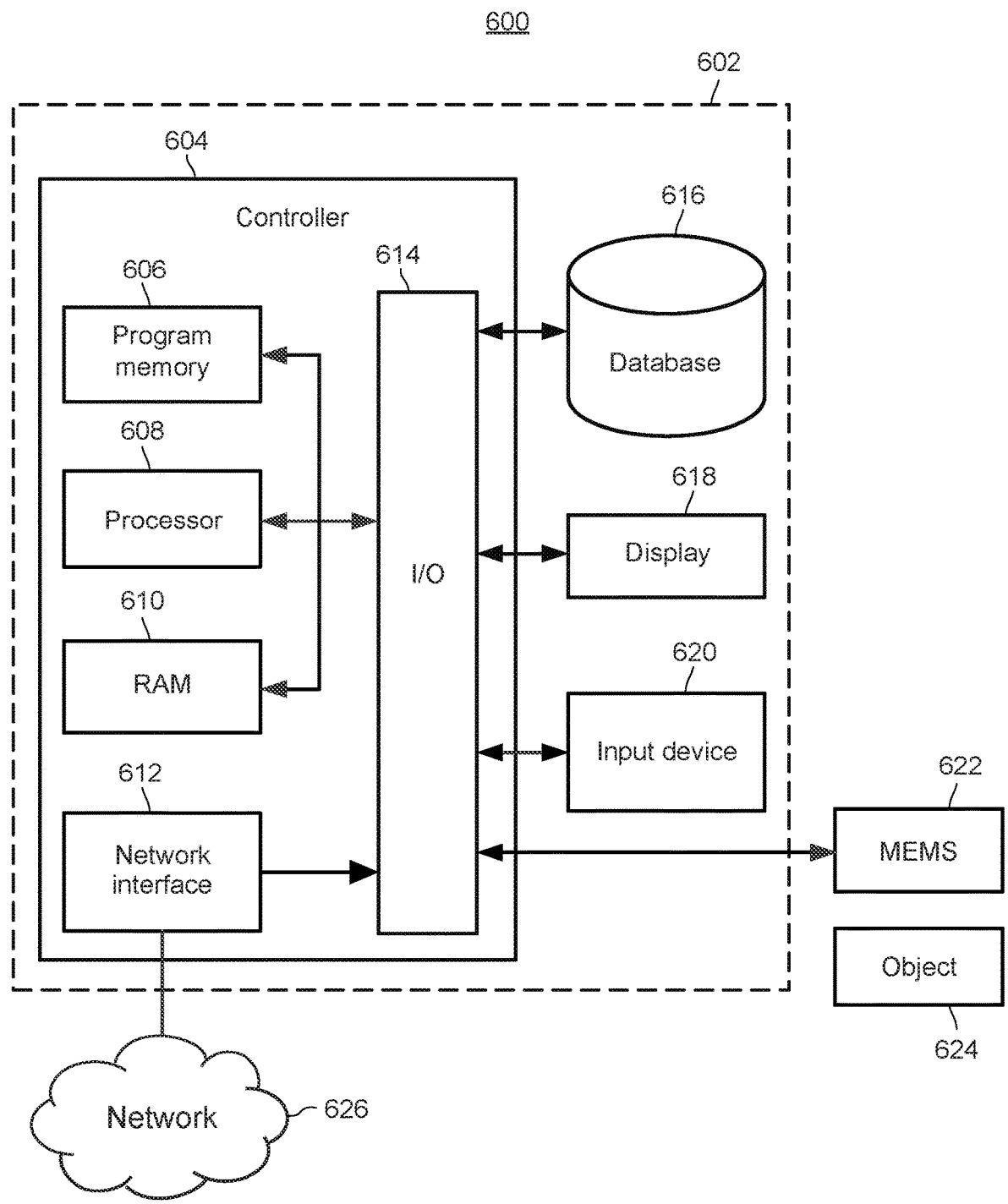
FIG. 6 depicts a system diagram for scanning (e.g., endoscopic scanning), according to an embodiment.

FIG. 6 is an example block diagram 600 illustrating the various components used in implementing an example embodiment of the scanner 602 described herein, which allows for the tuning of phase delay. The MEMS components 622 previously discussed herein may be positioned adjacent or operatively coupled to an object 624 in accordance with executing the functions of the disclosed embodiments. The scanner 602 may have a controller 604 operatively connected to the database 616 via a link connected to an input/output (I/O) circuit 614. It should be noted that, while not shown, additional databases may be linked to the controller 604 in a suitable manner. The controller 604 includes a program memory 606, a processor 608 (e.g., a microcontroller and/or a microprocessor), a random-access memory (RAM) 610, a network interface 612, and the input/output (I/O) circuit 614, all of which are interconnected via an address/data bus. It should be appreciated that although only one microprocessor 608 is shown, the controller 604 may include multiple microprocessors 608. Similarly, the memory of the controller 604 may include multiple RAMs 610 and multiple program memories 606. Although the I/O circuit 614 is shown as a single block, it should be appreciated that the I/O circuit 614 may include a number of different types of I/O circuits. The RAM(s) 610 and the program memories 606 may be implemented as semiconductor memories, magnetically readable memories, and/or optically readable memories, for example. The address/data bus may communicatively connect the controller 604 to the MEMS 622 150 through the I/O circuit 614.

The program memory 606 and/or the RAM 610 may store various applications (i.e., machine readable instructions) for execution by the microprocessor 608. For example, an operating system may generally control the operation of the MEMS 622 and provide a user interface to implement the processes described herein. The program memory 606 and/or the RAM 810 may also store a variety of subroutines for accessing specific functions of the MEMS 622. By way of example, and without limitation, the subroutines may include, among other things: a subroutine for controlling operation of the MEMS 622, or other endoscopic device, as described herein; a subroutine for capturing images with the MEMS 622 as described herein; a subroutine for predicting and/or correcting phase drift, as described herein; and other subroutines, for example, implementing software keyboard functionality, interfacing with other hardware in the MEMS 622, etc. The program memory 606 and/or the RAM 610 may further store data related to the configuration and/or operation of the MEMS 622, and/or related to the operation of one or more subroutines. For example, the data may be data gathered by the MEMS 622, data determined and/or calculated by the processor 608, etc. In addition to the controller 604, the MEMS 622 may include other hardware resources. For example, in some embodiments, the MEMS may be part of an endomicroscope and/or endoscope (not depicted) which may be coupled to various types of input/output hardware such as a visual display 618 and/or an input device 620 (e.g., keypad, keyboard, etc.). Such input and output devices may allow a user to interact with the controller 604 to fine tune actuation of an axial and/or lateral scanner. In an embodiment, the display 618 may be touch-sensitive, and may cooperate with a software keyboard routine as one of the software routines to accept user input.

Example Methods

Figure 7:
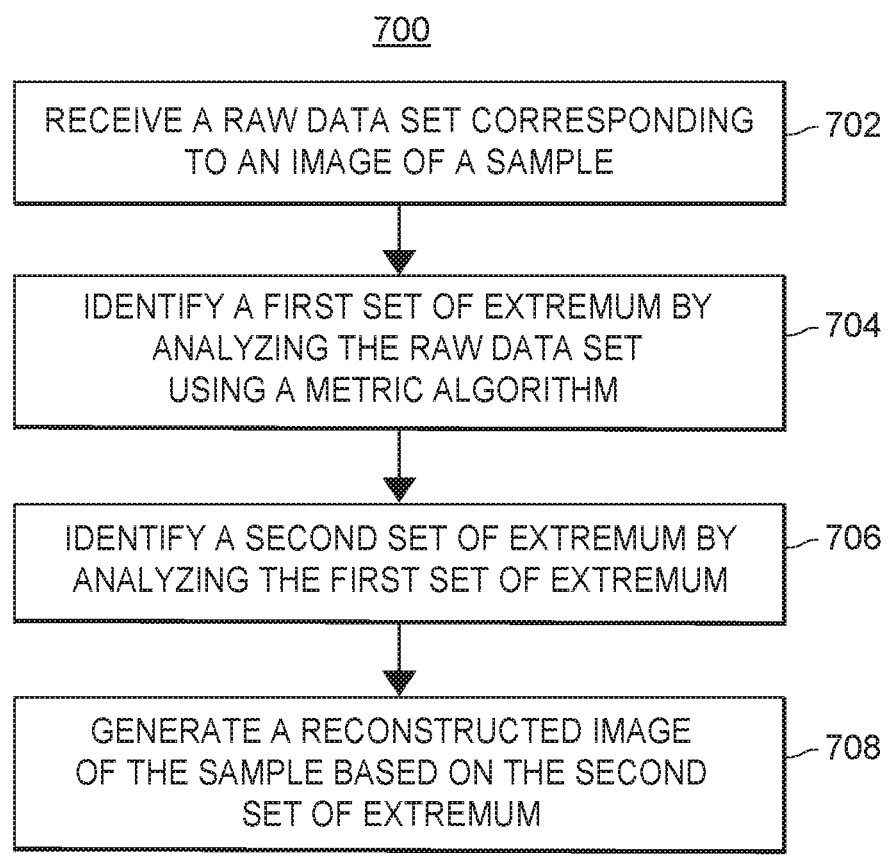
FIG. 7 depicts an example method for phase correction of a scanner, according to an embodiment.

FIG. 7 depicts a method 700 for correcting phase shift in a scanner. The method may include receiving a raw data set corresponding to an image of a sample (block 702). The raw data set may correspond to the raw data vector depicted in FIG. 1B. The sample may correspond to the coins depicted in FIG. 1A, the Object depicted in FIG. 1B, and/or the tissue depicted in FIG. 2A. The raw data set may be received via the I/O circuit 614 of FIG. 6. For example, the MEMS 622 may generate the raw data vector according to the scanning and translation process discussed with respect to FIG. 1B. The method 700 may identify a first set of extremum by analyzing the raw data set using a metric algorithm (block 704). For example, the method may include a global search along two axes, such as of a mirror scanning in two directions. The method 700 may select the combination of phase shifts resulting in the best image when constructed based on a blur metric and/or a sharpness metric. For example, the level of blur in the final constructed image may be minimized, and/or the level of sharpness may be maximized, as discussed above. Once the set of global extremum is identified, the method 700 may search about, or in the vicinity of, the global extremum to identify a second set of local extremum (block 706). For example, as discussed above with respect to FIG. 1D, plots 124 and 126 represent the global search using a blur metric, and plots 128 and 130 represent a local search around the initial approximated values. FIG. 1E represents the global and local search using the sharpness/variance metric. Once the global and local search have identified the second set of extrema, the minimized and/or maximized values may be used to regenerate the image, taking into account phase drift (block 708).

ADDITIONAL CONSIDERATIONS

In the foregoing, scanning techniques are discussed with respect to MEMS scanners in connection to endoscopic treatments. The present techniques may be implemented using any suitable sampling/scanning method including without limitation Lissajous scanning, raster scan, spiral scan, etc. Moreover, those of skill in the art will appreciate that the present techniques are applicable in additional fields/domains, for differing applications, including—without limitation—imaging, projection display technologies, 3D-printing technologies, scanning electron microscopy, and atomic force microscopy.

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method of predicting and/or correcting phase drift, the method comprising
receiving, via a processor, a raw data set representing an image of a sample,
identifying a first set of extremum by analyzing the raw data set using a metric algorithm, the first set of extremum corresponding to global phase values along orthogonal axes,
identifying a second set of extremum by analyzing the first set of extremum, the second set of extremum corresponding to local phase values along the orthogonal axes, and
generating, based on the second set of extremum, a reconstructed image of the sample, the reconstructed image having a corrected phase.

2. The computer-implemented method of claim 1 further comprising:
obtaining the raw data set using a single-axis confocal endoscope.

3. The computer-implemented method of claim 1 further comprising:
obtaining the raw data set using a dual-axis confocal endoscope.

4. The computer-implemented method of claim 1 wherein receiving the raw data set representing the image of the sample includes using a microelectrical mechanical system mirror or a galvomirror.

5. The computer-implemented method of claim 1 wherein the sample is a tissue sample.

6. The computer-implemented method of claim 1,
wherein identifying the first set of extremum includes experimentally determining an initial set of extremum in a controlled environment, and
wherein identifying the second set of extremum by analyzing the first set of extremum includes performing a local search in the vicinity of the first set of extremum.

7. The computer-implemented method of claim 1,
wherein identifying the first set of extremum includes determining an approximate initial set of extremum using a global search over a predetermined domain, and
wherein identifying the second set of extremum by analyzing the first set of extremum includes performing a local search around the approximate initial set of extremum.

8. The computer-implemented method of claim 1, wherein identifying the first set of extremum includes using a gradient search algorithm or Fibonacci search algorithm.

9. The computer-implemented method of claim 1
wherein the metric algorithm is a blur metric, and
wherein identifying the first set of extremum by analyzing the raw data set using the blur metric includes generating a binarized data set by binarizing the raw data using a predetermined threshold value.

10. The computer-implemented method of claim 9 wherein the predetermined threshold value is about the mean of a set of values in the raw data.

11. The computer-implemented method of claim 1
wherein the metric algorithm is a sharpness metric, and
wherein identifying the first set of extremum by analyzing the raw data set using the sharpness metric includes calculating the variance of pixel intensities.

12. A computing system comprising:
a phase correcting scanner,
one or more processor,
a display device,
a memory including computer-executable instructions that, when executed by the one or more processor, cause the computing system to:
sample, via the phase correcting scanner, an object to generate a one-dimensional time series data set representing an image of the object, the one-dimensional time series data set having intensities corresponding to the image of the object at a predetermined sampling interval,
calculate a metric on the one-dimensional time series,
repeatedly calculate an extrema until a phase delay quantity is optimized,
map the one-dimensional time series data set to a two-dimensional image space corresponding to the object, and
display the two-dimensional image in the display device.

13. The computing system of claim 12, wherein the predetermined sampling interval is a Lissajous pattern.

14. The computing system of claim 12, wherein the predetermined sampling interval is either a raster pattern or a spiral pattern.

15. A phase correcting scanner comprising:
one or more processors;
one or more scanner adapted to sequentially sample an object to generate a vector of raw data representing the object in a Lissajous pattern, and
a memory storing instructions that, when executed by the one or more processors, cause the phase correcting scanner to:
receive the vector of raw data,
identify a first set of extremum by analyzing the raw data set using a metric algorithm, the first set of extremum corresponding to global phase values along orthogonal axes, and
identify a second set of extremum by analyzing the first set of extremum, the second set of extremum corresponding to local phase values along the orthogonal axes, wherein identifying the first set of extremum includes experimentally determining an initial set of extremum in a controlled environment, and wherein identifying the second set of extremum by analyzing the first set of extremum includes performing a local search in the vicinity of the first set of extremum.

16. The phase correcting scanner of claim 15, the memory storing further instructions that, when executed, cause the phase correcting scanner to:

determine an approximate initial set of extremum using a global search over a predetermined domain, and perform a local search around the approximate initial set of extremum.

17. The phase correcting scanner of claim 15, wherein the metric algorithm is a blur metric, the memory storing further instructions that, when executed, cause the phase correcting scanner to:

generate a binarized data set by binarizing the raw data using a predetermined threshold value.

18. The phase correcting scanner of claim 17, wherein the predetermined threshold value is about the mean of a set of values in the raw data.

19. The phase correcting scanner of claim 15, wherein the metric algorithm is a sharpness metric, the memory storing further instructions that, when executed, cause the phase correcting scanner to calculate the variance of pixel intensities.

* * * * *

UNITED STATES PATENT AND TRADEMARK OFFICE
CERTIFICATE OF CORRECTION

| | | |
|---|---|---|
| PATENT NO. | : 12,198,309 B2 | Page 1 of 1 |
| APPLICATION NO. | : 17/288886 | |
| DATED | : January 14, 2025 | |
| INVENTOR(S) | : Kenn Oldham et al. | |

It is certified that error appears in the above-identified patent and that said Letters Patent is hereby corrected as shown below:

In the Claims

At Column 15, Line 33, "comprising" should be -- comprising: --.

At Column 16, Line 12, "claim 1" should be -- claim 1, --.

At Column 16, Line 21, "claim 1" should be -- claim 1, --.

At Column 16, Line 55, "pattern," should be -- pattern; --.

Signed and Sealed this
First Day of July, 2025

Coke Morgan Stewart
*Acting Director of the United States Patent and Trademark Office*